No. 732,258. Patented June 30, 1903.

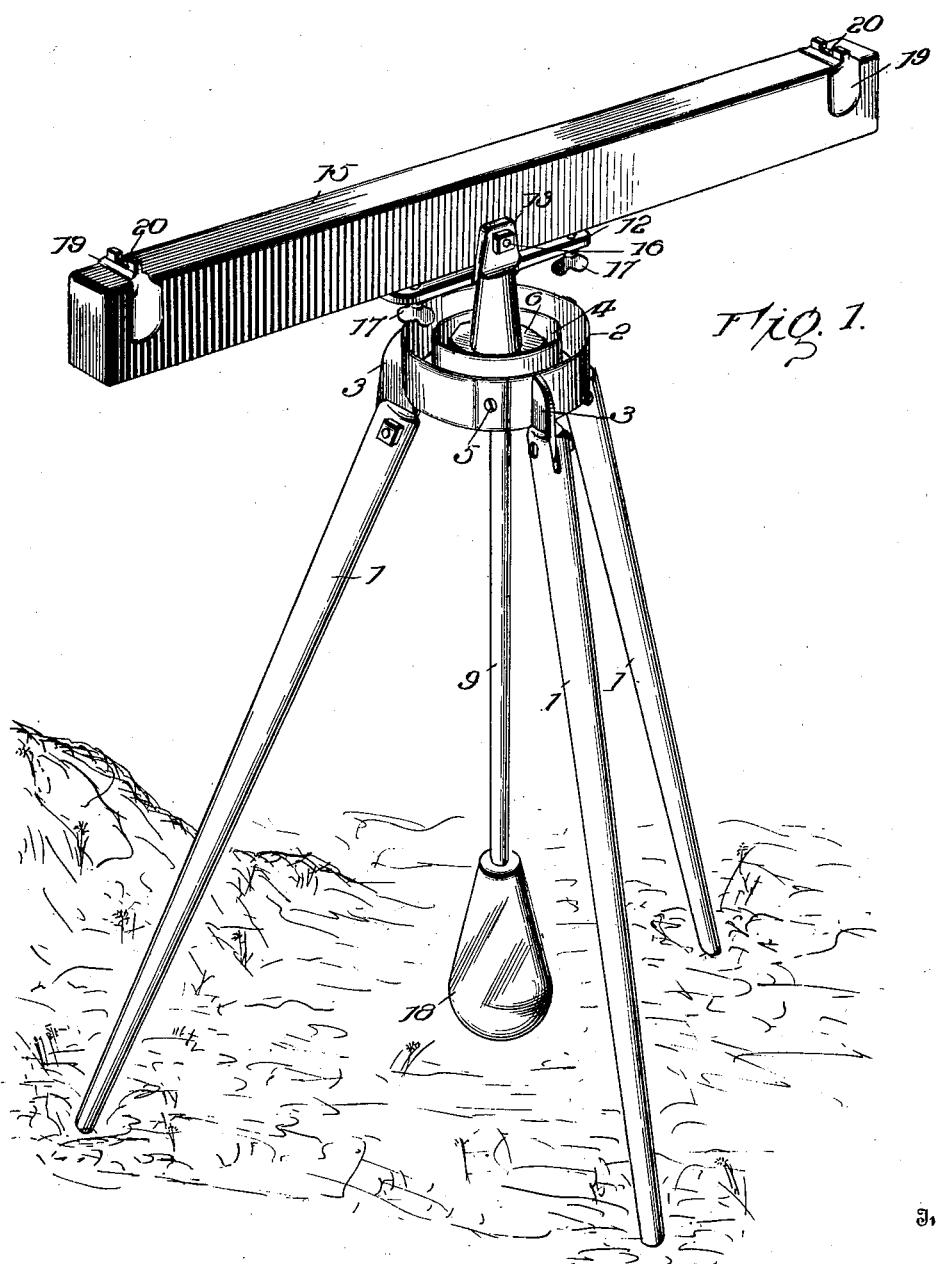

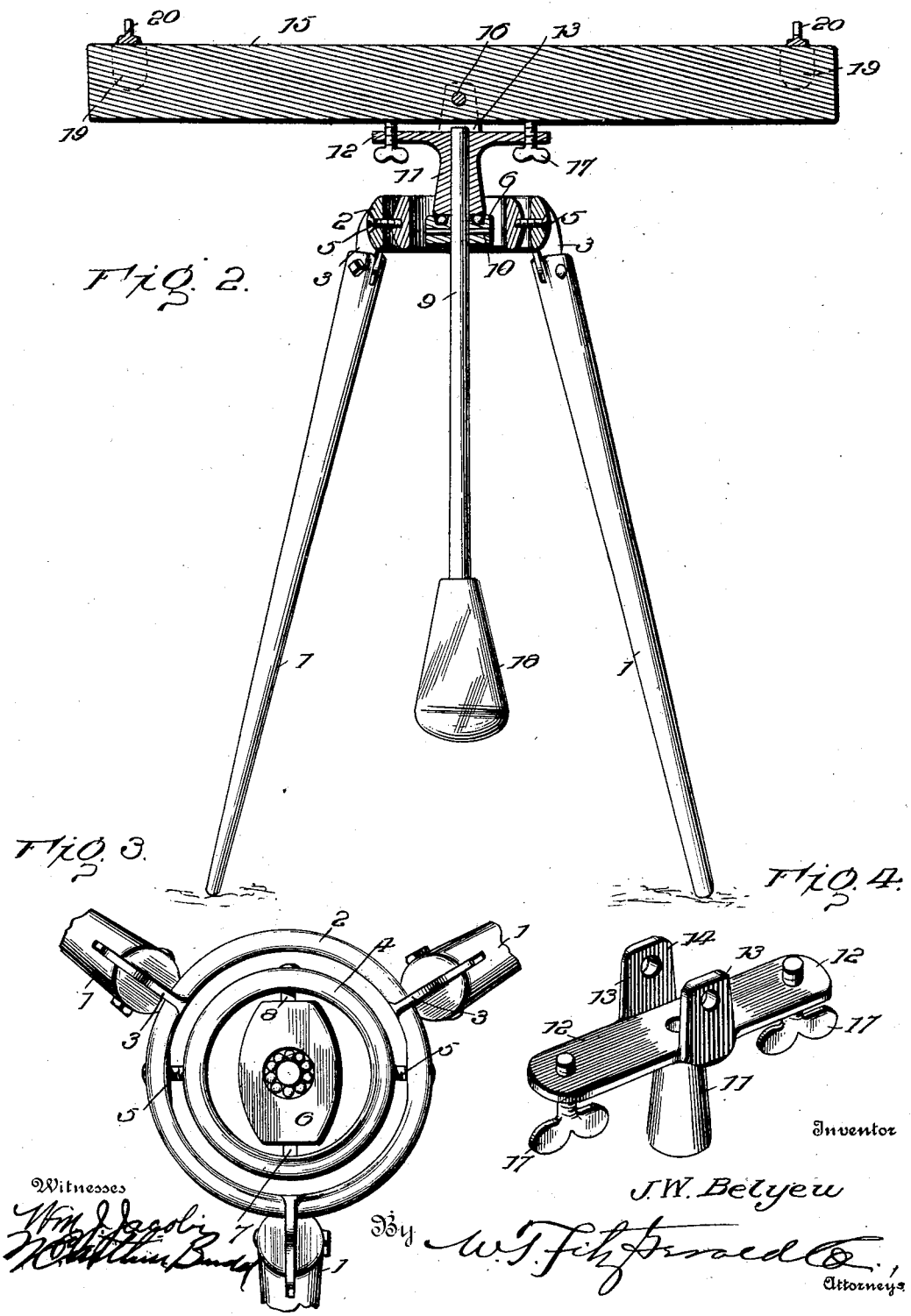

UNITED STATES PATENT OFFICE.

JOHN WILLIAM BELYEU, OF ALEXANDER CITY, ALABAMA.

AUTOMATIC LEVELING INSTRUMENT.

SPECIFICATION forming part of Letters Patent No. 732,258, dated June 30, 1903.

Application filed November 7, 1902. Serial No. 130,437. (No model.)

*To all whom it may concern:*

Be it known that I, JOHN WILLIAM BELYEU, a citizen of the United States, residing at Alexander City, in the county of Tallapoosa and State of Alabama, have invented certain new and useful Improvements in Automatic Leveling Instruments; and I do hereby declare the following to be a full, clear, and exact description of the invention, such as will enable others skilled in the art to which it appertains to make and use the same.

My invention has relation to measuring instruments, and relates more particularly to an appliance designed to be auxiliary to the measuring instrument proper, whereby such instrument may be very readily and accurately applied to use without regard to the surface of the ground of the immediate locality where it is used without reference to the general topography of the country.

The prime object of my invention, among many others, is to provide simple though reliably-efficient mechanism whereby a truly horizontal support will at all times be afforded for the leveling or surveying instruments, whether the survey is applied to a rough or level surface.

A further object of my invention is to render my leveling instrument readily adjustable, whereby not only a support lying in a true horizontal plane may be provided for a surveying instrument or the like, but any desired degree of inclination may be readily provided for said support, whereby a grade of any percentage of inclination may be established or a ditch, canal, or the like laid out with any desired degree of fall.

Other objects and advantages will be hereinafter made clearly apparent, reference being had to the accompanying drawings, which are made a part of this application, and in which—

Figure 1 illustrates a perspective view of my invention complete ready for use in connection with any variety of leveling or surveying instrument. Fig. 2 is a central section of the support proper and coöperating parts. Fig. 3 is a top plan view of the supporting member or base proper. Fig. 4 is a detail view in perspective, showing the preferred means employed for effecting an accurate adjustment of the supporting-base.

In materializing my invention I first provide a tripod-support, and in connection with such support I incorporate or combine a compass frame or support consisting of a universal joint which will permit the body portion or base of my leveling instrument to assume a true horizontal position by means of gravity acting upon the counterpoise carried by said base-section, as will be hereinafter specifically pointed out.

In order to conveniently designate the several parts of my invention and the coöperating accessories deemed necessary to illustrate a practical application of my invention to use, numerals will be employed, the same numeral referring to a similar part throughout the several views.

Referring to the numerals on the drawings, I provide, preferably, three supporting-legs 1, which are pivotably connected to the exterior collar-section 2 by means of the integral extensions or brackets 3, which are disposed radially around the collar-section 2, so that they will stand at equal distances apart. By reason of the pivotal connection of the supporting-legs and the brackets 3 said legs may be readily adjusted so as to enable the same to compensate for any uneven surface of the ground at the point where the instrument is to be used and enable the operator to dispose the collar-section 2 at least approximately in a true horizontal plane. Within the exterior collar-section 2 I dispose concentric therewith the auxiliary collar 4, which is provided at diametrically opposite points with supporting-trunnions adapted to take into apertures provided in a contiguous part of the exterior collar, or said auxiliary collar 4 may be provided upon opposite sides with a suitable recess adapted to receive the preferably conical end of the set-screw 5, which latter takes through a threaded seat provided in the collar 2, thereby enabling said screws to be properly adjusted to permit the auxiliary collar to play freely thereon, and thus compensate for the movement of other parts, which will be hereinafter pointed out.

Within the auxiliary collar 4 I locate the pivoted member 6, which may be provided at one end with the trunnion 7, adapted to take into a suitable aperture or recess in a contiguous part of the auxiliary collar 4, while its opposite end is provided with a recess adapted to receive the end of the set-screw 8, which latter is seated in a threaded aperture provided in a contiguous part of the auxiliary collar 4, thereby enabling said set-screw to be properly adjusted, so that the member 6 may play or rock freely upon the point thereof and upon the lug 7. The member 6 is provided at its central part with a vertically-disposed aperture adapted to receive the upper end of the shaft 9, said shaft being held in union with the member 6 by the pin 10 or an equivalent device. The upper end of the shaft 9 is extended above the member 6 sufficiently to afford a support for the base-holding member 11, said member being provided with a vertically-disposed aperture of proper size to receive the end of said shaft, as clearly shown in Fig. 2.

The base-holding member 11 is provided upon its upper end with a pair of diametrically-disposed arms 12 and upon opposite sides with the ears 13, which latter are provided with suitable apertures 14, designed to register with an aperture extending through the central part of the base-section 15, whereby the securing-bolt 16 may be extended, and thereby secure said base in pivotal union with said ears. Each of the arms 12 is provided near its outer end with a threaded aperture adapted to afford a seat for the threaded stem of the set-screws 17, and since said set screws are extended entirely through the arms the free ends thereof are adapted to bear against the under side of the base 15 and enable the said base to be adjusted relatively to the plane of the shaft 9, so that said base and shaft will extend truly at right angles to each other or disposed at any desired angle which will leave the base-section in proper position to give a varied pitch or fall to a ditch or canal.

The object, therefore, of the construction above described is to readily enable the base-section 15 to be properly disposed either in a true horizontal plane or at any desired degree of inclination. The lower end of the shaft 9 is provided with the counterpoise 18, which is firmly secured to said shaft in any preferred way or integrally formed therewith, and it is obvious that by reason of the peculiar mounting provided for the member 6, which directly supports said shaft in place, said shaft is left free to assume a true vertical position by reason of its counterweight 18; and since the member 11 is carried by the upper end of said rod and the base-section 15 is supported thereby it follows that when said base and shaft 9 are disposed truly at right angles to each other said base will be automatically brought by the weight 18 into a true horizontal plane, thus enabling any of the delicate instruments employed by the surveyor to be placed upon said base and accurately operated.

Suitable supporting-brackets 19 for the surveying instrument or the level may be provided for each end of the base 15, if deemed desirable, a recess 20 being formed in the upper side of the bracket to receive and support the ends of a level or other instrument placed thereon. In order to reduce the friction between the members 6 and 11 to a minimum, a suitable groove may be provided in the upper side of the member 6, surrounding the shaft 9, and a plurality of antifriction-balls may be placed in said groove, the balls being of sufficient size to insure that they will be peripherally engaged by the lower end of the member 11, as will be readily understood by reference to Fig. 2.

Inasmuch as the base 15 is pivotally connected with the ears 13 and said base is held slightly above the arms 12, so as to rest directly on the ends of the set-screws 17, it is obvious that a proper adjustment of the set-screws will enable the base member to be easily adjusted so as to stand truly at right angles to the shaft 9 when it is desired to dispose the base in a true horizontal plane. When, however, it is desired to give the proper pitch of inclination to the base 15, it is also clearly apparent that this may be easily accomplished by readjusting the set-screw 17 so as to dispose and secure said base as desired.

It will be obvious that by means of the foregoing construction the base 15 will be disposed in any desired plane of inclination or in a true horizontal plane without reference to the plane occupied by the collars 2 and 4 or the supporting member 6, since the shaft 9 will be always brought into a true vertical position by the counterpoise 18 without reference to the surface of the ground or relative position of the legs 1.

My improved leveling instrument will be found very desirable for a great variety of purposes, many of the uses being hereinbefore enumerated, and while I have described the preferred combination and construction of parts deemed necessary in carrying out my invention I wish to comprehend such substantial equivalents and substitutes as fairly fall within the scope of my invention.

Having thus fully described my invention, what I claim as new, and desire to secure by Letters Patent, is—

1. In a leveling instrument of the character specified, the combination with suitable supporting-legs, of an outer collar-section; an auxiliary collar 4 pivotally mounted within said outer collar; a member 6 pivotally secured within said auxiliary collar 4 and having a central aperture; a shaft mounted in said aperture; a supporting member 11 carried by the extended upper end of said shaft; a base member pivotally connected to said supporting member; oppositely-extending arms 12 carried by said supporting member; a set-screw carried by each arm and adapted to bear against the base member whereby said member may be relatively adjusted with respect to said shaft substantially as specified and for the purpose set forth.

2. In a leveling instrument of the class described, the combination with an outer collar-section 2 having integral depending ears 3, of suitable legs pivotally attached to said ears; an auxiliary collar 4 rotatably mounted within said outer collar; a member 6 pivotally mounted within the said collar 4, its pivot-points being diametrically opposite to the pivot-points of said collar 4; a central aperture through said member 6; a groove surrounding the upper end of said aperture; a shaft mounted in said aperture; a supporting member 11 carried by the upper end of said shaft, the lower end of said member resting upon suitable friction-balls located in said groove substantially as specified and for the purpose set forth.

In testimony whereof I affix my signature in presence of two witnesses.

JOHN WILLIAM BELYEU.

Witnesses:
W. R. GRIMES,
F. O. HOOTON.